K. STEINBECKER.
VALVE ACTUATING MECHANISM FOR INTERNAL COMBUSTION ENGINES.
APPLICATION FILED DEC. 18, 1911.
1,066,671.   Patented July 8, 1913.
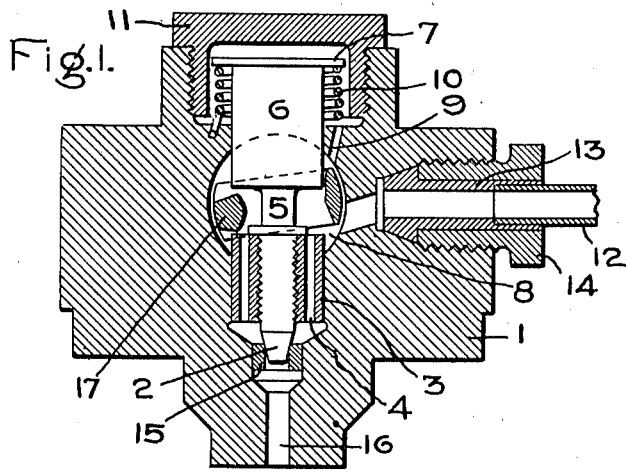
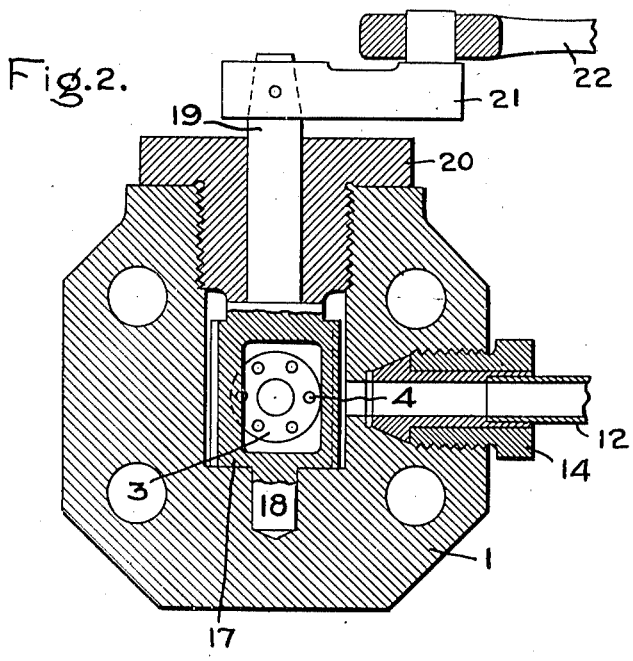
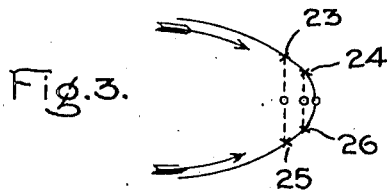
Witnesses:
Inventor:
Karl Steinbecker,
by
His Attorney.

UNITED STATES PATENT OFFICE.

KARL STEINBECKER, OF CHARLOTTENBURG, GERMANY, ASSIGNOR TO GENERAL ELECTRIC COMPANY, A CORPORATION OF NEW YORK.

VALVE-ACTUATING MECHANISM FOR INTERNAL-COMBUSTION ENGINES.

1,066,671. Specification of Letters Patent. Patented July 8, 1913.

Application filed December 18, 1911. Serial No. 666,396.

*To all whom it may concern:*

Be it known that I, KARL STEINBECKER, a subject of the King of Prussia, residing at Charlottenburg, Germany, have invented certain new and useful Improvements in Valve-Actuating Mechanism for Internal-Combustion Engines, of which the following is a specification.

The present invention relates to valve actuating mechanism for internal combustion engines and more especially to the actuation of valves in oil engines working on the so called constant pressure principle for controlling the admission of fuel to the cylinders.

For consideration of what I believe to be novel and my invention, attention is directed to the accompanying description and claims appended thereto.

In the accompanying drawing which illustrates one of the embodiments of my invention, Figure 1 is a vertical section of a valve mechanism, Fig. 2 is a cross-section of the same and Fig. 3 is a velocity diagram of a machine part for actuating the valve.

1 indicates a body of any suitable construction which is adapted to be bolted to a suitable part of the engine, and is provided with a central opening to receive a valve 2. The valve is provided with a piston 3 that is screw-threaded to the valve stem and is adjustable thereon. The periphery of the piston makes a sliding fit with the bore of the body and therefore acts as a guide for the valve. The piston is provided with a series of longitudinally extending holes 4 that serve when the valve is closed to balance the pressures on opposite sides thereof. Formed integral with the valve stem 5 or secured thereto in any suitable manner, is a second piston 6, the latter being provided with a head 7. The piston makes a sliding fit in the bore of the body and therefore forms a guide for the valve.

8 indicates a chamber that is in communication with the source of fluid pressure.

In order to partially balance the pressures at the opposite ends of the piston 6, the passage 9 is provided, that communicates with the central chamber 8 and the space above the piston.

Surrounding the piston and situated between the head 7 and a shoulder formed on the body is a compression spring 10. This spring tends at all times to raise the valve, but the pressure distribution is such that when the valve is seated there is a preponderance of pressure tending to hold the valve against its seat. I have shown a spring that tends to open the valve but obviously any equivalent device such as an unbalanced piston may be employed. The piston 6 is covered by a screw-threaded cap 11.

12 indicates a conduit carrying fluid under pressure that is seated in a sleeve 13, the latter having a conical end that engages a similarly shaped seat in the body. The sleeve is held in place by a screw-threaded plug 14.

The valve 2 is conical and has a removable seat 15, that has a conical surface to receive the valve. Extending from the valve is a conduit 16 through which fluid passes from the conduit 12 subject to the control of the valve.

In order to move the valve an actuator is provided, comprising a rectangular yoke 17 located in the chamber 8 that is provided with a trunnion 18, and a spindle 19, the latter being mounted in a screw-threaded plug 20. The diameter of this plug is slightly greater than the width of the yoke so that when the plug is removed, the yoke can be pulled out end-wise. On the end of the spindle 19 is a crank 21, that is actuated by any suitable means, such for example as the connecting rod 22.

From Fig. 1 it will be seen that the thickness of the left-hand side of the yoke 17 is less than the distance between the lower end of the piston 6 and the upper end of the piston 3. This arrangement forms a lost-motion device or connection, whereby the yoke and crank and the parts associated therewith can have a certain limited movement without affecting the position of the valve. Assuming that it is desired to open the valve, the yoke 17 is turned in a clockwise direction, which first takes up the lost motion, and then raises the valve by a slight amount. As soon as this happens, the valve is balanced as to fluid pressure, but is unbalanced due to the action of the spring 10. This spring then moves the valve upward until the piston 3 strikes the underside of the yoke. Further movement of the yoke in the same direction will permit the valve to open to a greater extent. The closing of the valve is accomplished by moving the yoke in an anti-clockwise direction.

In Fig. 3 is shown a portion of a velocity diagram of a machine part for moving the valve actuator, i. e. the yoke 17. To the wrist pin on the crank is connected a connecting rod 22 or equivalent device, and it is to the means for moving the crank that the diagram relates. This rod may be reciprocated by a crank pin, by an eccentric, cam, or other device capable of rotating in either direction at the will of the operator. On the diagram the portion from 23 to 24 indicates the interval when the yoke is taking up lost-motion, and the portion 24 to 25 the opening and closing of the valve. This is assuming a direction of movement of the machine part as indicated by the full line arrow. On the other hand, if the machine part moves in the opposite direction indicated by the dotted arrow, as by reversing the engine, the portion of the diagram 25—26 indicates the interval when the yoke is taking up lost motion, and the portion 26 to 23, the opening and closing of the valve. From the foregoing it will be clear that the yoke and its crank have an oscillating movement imparted by the rod 22, and that the agent which reciprocates the rod may move clockwise or anti-clockwise.

The arrangement shown and described is very advantageous because it permits of the use of a single external actuating means which may be driven forward or backward, whereas in other valve arrangements heretofore used for the purpose, two external devices acting in alternation on the valve have been found necessary. It is further advantageous because it permits of accurately moving the valve, thereby insuring the admission of the proper amount of fuel to the engine cylinder.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a device of the character described, the combination of a body, a fluid pressure seated valve located therein, an actuator one end of which extends into the fluid space and acts through lost-motion on the valve, and a means operated by a machine part for moving the actuator.

2. In a device of the character described, the combination of a body, a valve located therein which is held against its seat by fluid pressure, a piston for said valve, a pivotally supported actuator one end of which extends into the fluid space and acts on said piston through lost-motion, and a crank mounted on the actuator and located outside of the body.

3. In a device of the character described, the combination of a body, a valve located therein which is held against its seat by fluid pressure, a pivotally supported actuator that acts on the valve through lost-motion, a means that takes up the lost-motion as soon as the valve is raised from its seat, and means external to the valve for moving the actuator forward and backward.

4. In a device of the character described, the combination of a body, a valve located therein which is held against its seat by fluid pressure and is balanced as to fluid pressure when open, a means that tends to open the valve, an oscillating actuator that acts on the valve through lost-motion in opening it and acts directly on the valve in closing it, and means for moving the actuator.

5. In a device of the character described, the combination of a body, a valve located therein having two pistons, a yoke located between the pistons which is of less depth than the space between them, a spring that acts to open the valve, and a crank for moving the yoke.

6. In a device of the character described, the combination of a body, a valve located therein and provided with two pistons, said valve and pistons being slightly unbalanced when the valve is closed and balanced as to fluid pressure when it is open, a means that tends at all times to open the valve, an actuator that extends between the pistons and acts thereon through a lost-motion, and means for moving the actuator.

7. In a device of the character described, the combination of a body, a valve, a pair of pistons mounted on the valve stem and acting as guides for the valve, said pistons being substantially balanced as to fluid pressure and separated by a space, a yoke through which the valve stem extends, said yoke being located between the pistons and acting thereon through lost-motion, a spring tending to open the valve which takes up the lost-motion in one direction when the valve is raised from its seat, and a means external to the body for oscillating the yoke.

8. In a device of the character described, the combination of a body, a valve therein, pistons for balancing the valve when open and for holding it against its seat when closed, an actuator that acts on the valve through lost-motion, and a spring that takes up the lost-motion in one direction as soon as the valve is lifted from its seat.

In witness whereof, I have hereunto set my hand this first day of December, 1911.

KARL STEINBECKER.

Witnesses:
   HENRY HASPER,
   WOLDEMAR HAUPT.